Dec. 13, 1927.                                                    1,652,682
R. M. G. PHILLIPS
GLARE DEVICE
Filed May 7, 1926                      2 Sheets-Sheet 1
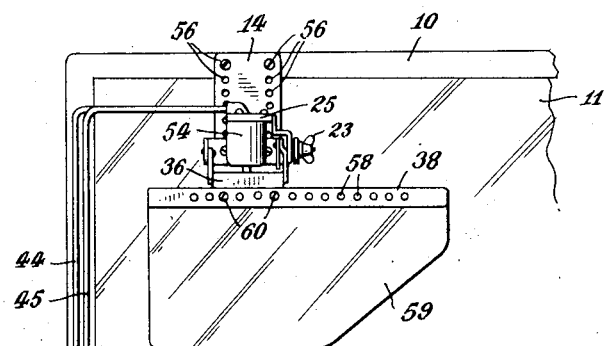
Fig. 1.
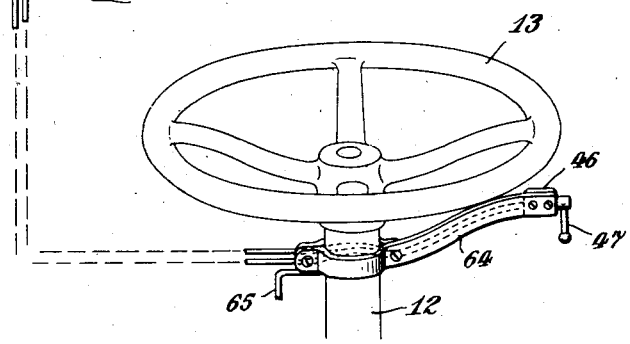
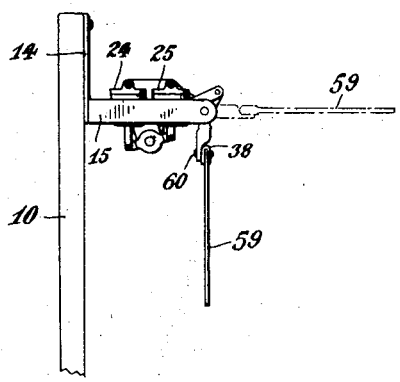
Fig. 2.
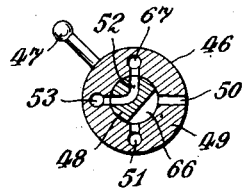
Fig. 2.
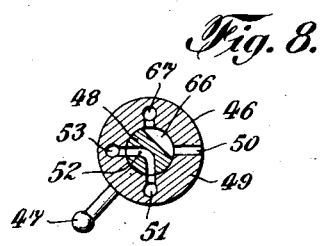
Fig. 8.
INVENTOR
Ross M. G. Phillips
BY
ATTORNEY Dec. 13, 1927.

R. M. G. PHILLIPS

GLARE DEVICE

Filed May 7, 1926

INVENTOR
Ross M. G. Phillips
BY George E. Hall
ATTORNEY

Patented Dec. 13, 1927.

1,652,682

UNITED STATES PATENT OFFICE.

ROSS M. G. PHILLIPS, OF NEW HAVEN, CONNECTICUT.

GLARE DEVICE.

Application filed May 7, 1926. Serial No. 107,415.

This invention relates to improvements in anti-glare devices for motor vehicles and consists of the matters hereinafter described and more particularly pointed out in the appended claims.

It is the object of this invention, among other things, to provide an anti-glare device having a semi-transparent panel, capable of being hinged to or above the wind shield of an automobile, or other part thereof, so that it may be adjusted to screen the eyes of the driver from the glare of approaching headlights or of the sun, leaving the vision at either side of the screen unobstructed; and of means, including a controlling device, within easy reach of the driver, as a lever adjacent to the steering post near the steering wheel, for adjusting the anti-glare shield properly at any angle from a horizontal inoperative position to a vertical or operative position; the provision of means for operating the device by the suction of the intake manifold engine; to so construct the mechanism that the shield will be firmly locked in both its up and down positions; and to provide means for a vertical and horizontal adjustment of the anti-glare shield to meet varying conditions, both as to the automobile and the height and position of the operator.

The objects and features of the invention will be best and more fully understood from the following detail description of a preferred form thereof, through which reference is had to the accompanying drawings; wherein,—

Figure 1 is a perspective view of the device mounted on a typical automobile wind shield;

Figure 2 is an end elevation thereof;

Figure 7 is a detail sectional view of the control valve positioned to raise the shield to its up position; and Figure 8 is a similar view positioned to lower the shield to its down or operative position.

Figure 3:
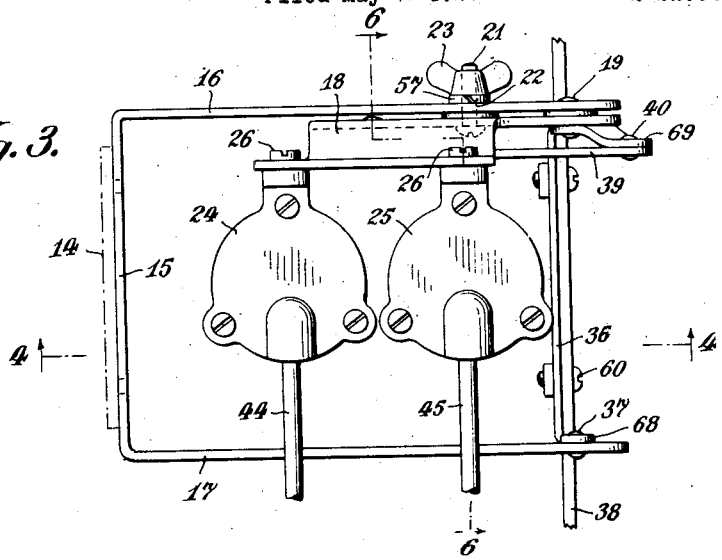
Figure 3 is a plan view thereof, upon a larger scale.

Referring now in detail to the embodiment of the form of the invention illustrated in the accompanying drawings; 10 indicates a portion of the frame of the windshield 11, which is mounted in a conventional manner; 12 the steering post; 13 the steering wheel; 14 the securing plate having a series of openings 56 at the opposite sides thereof for the passage of screws, bolts or the like, whereby the same may be rigidly attached to the frame 10. Near one end of this plate is a substantially U-shape bracket 15, the arms 16 and 17 thereof extending in a plane at substantially a right angle to the plate. Hinged to the arm 16 by the stud 19 is the carrier plate 18, having an arcuate slot 20, through which passes the bolt 21. This bolt also passes through an opening 22 in the arm 16 and has a split washer 57 and nut 23 thereon whereby an angular adjustment of the plate 18 relative to the arm 16 is obtained.

Pivotally suspended from the plate 18 by the screws 26, or the like, in tandem relation, are the cylinder caps 24 and 25, which form head members for the cylinders 54. Each of these caps is provided with a port 27, for a purpose hereinafter indicated. As both the suction-actuated, motion transmitting devices are the same in construction, the following description of one will apply equally to the other. In each of the cylinders 54 is a piston head 29 connected with the piston rod 30.

Journaled on a stud 55 in the plate 18 is a tooth sector 34 that is provided with laterally projecting ears 33. There is a link 32 pivotally mounted at each end that connects each of the ears 33 with the piston rod 30. The shield carrier, as shown herein, is constructed of a single piece of metal, having a central portion 36, which is provided with a plurality of perforations 58 near its lower edge and terminating at one end in an angular plate 35 having a link arm 69 formed thereon and journaled upon the stud 19, and a plate 68 at the other end which is journaled upon the stud 37.

Along the upper edge of the shield 59, which is made of semi-transparent material, is a perforated rim 38, by means of which the shield may be held in any desired sidewise position by suitable screws 60, bolts, nuts or the like, passing through the plate 36 and rim 38.

Figure 4:
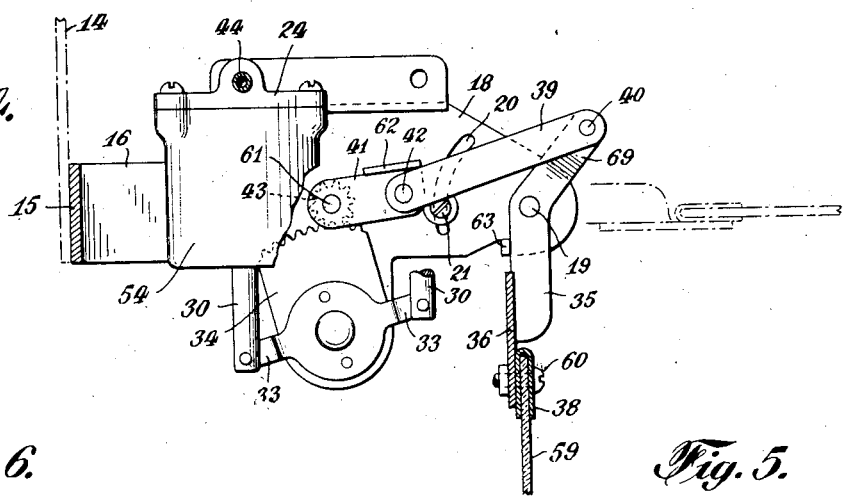
Figure 4 is a fragmentary elevation thereof, the parts in section being taken generally upon the plane indicated by the line 4—4 of Figure 3, and wherein one of the cylinders is removed.
Figure 6:
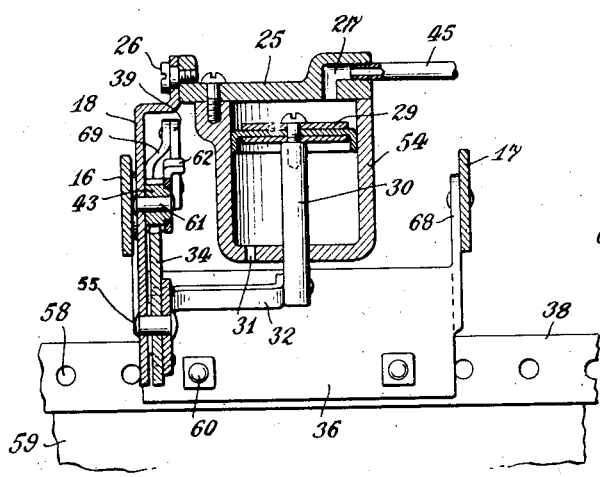
Figure 6 is a sectional view of the parts taken generally upon the plane indicated by the line 6—6 in Figure 3.

Journaled upon a stud 61 in the plate 18 is a pinion 43, secured near one end to a link 41. A link 39 connects the arm 69 with the link 41, being journaled at one end upon the stud 42 and the other end upon the stud 40. A laterally projecting wall 62 upon the link 41, provides means for limiting the relative movement of the links 39 and 41, as shown in Figure 4, when the shield 59 is in its substantially vertical position and the center of the stud 42 is below a straight line extending from the center of the stud 61 to the stud 40. This position is determined by contact of the wall 62 with the link 39. A stop 63 on the plate 18, by its engagement with the plate 35 also provides an auxiliary limiting means for positioning the shield 59. The pinion 43 derives its motion from the engagement of its teeth with those of the sector 34.

Suitable pipes 44 and 45 connect each of the ports 27 with a control valve 46 mounted on a bracket 64 secured to the steering post 12. Another pipe 65 connects this valve 46 with the manifold of the engine (not shown) for transmitting suction to either of the cylinders, as may be desired and by the operation of the valve. The detail construction of this valve is not important to the present invention, as any one of many forms of valve may be used. As shown, however, this control valve is of a rotary plug type, having a plug 48 within a casing 49 and a handle 47. The plug 48 has a cut-away portion 66, which is always in register with the exhaust port 50 and according to position with either of the ports 51 or 67, the former of which is connected with the pipe 45 and the latter with the pipe 44. Thus the suction in either one of the cylinders 54 may be broken. This plug 48 is also provided with an angular port 52, which registers in its extreme positions with the port 53 connected with the pipe 65 or either one of the ports 51 or 67, in communication, as above mentioned, with the pipes 44 and 45.

In Figure 1 the anti-glare shield 59 is in a vertical operative position, substantially parallel with the wind-shield 11. When it is desired to move this shield to a non-usable positon, that is, to a horizontal plane, the operator moves the valve handle 47 one-quarter turn with his finger without taking the hand off the steering wheel, which causes the suction from the engine to communicate through ports 53, 52 and 51, pipe 44, and port 27, into the cylinder 54 at the left of Figure 4, thereby causing the piston to move upwardly and at the same time breaking the suction in the other piston cylinder which is forced downwardly, due to the rocking motion transmitted by the sector 34. Air in the cylinder escapes during this action through a port 31 in the lower wall thereof. Likewise the pinion 43 is caused to rotate about the stud 61, causing the link 41 and the shield carrier to move to the positions indicated in Figure 5, thereby bringing the shield 59 to a substantially horizontal plane, as indicated by dotted lines in Figures 2 and 4. The shield is returned to its vertical and operative position by reverse operations.

By utilizing the perforations 56 in the plate 14 the vertical position of the mechanism may be varied to accommodate frames of windshields of various sizes and structure, or to enable the device to be connected with the rigid vertical wall or other part of the car. These perforations are spaced apart substantially the same as are those in the portion 36 and rim 38, so that if necessary or desirable, the plate 14 may be connected with the portion 36 and rim 38, in which case the bracket 15 will be connected directly with the windshield frame or other portion of the car.

Sidewise adjustment of the shield is obtained by utilization of the perforations in the rim 38, as will be obvious.

By manipulation of the nut 23 and the carrier plate 18, the position of the latter and the parts connected therewith relative to the bracket 15, may be varied, thus insuring a constant vertical position of the shield 59, or a position approximating it, as may be desired by the operator of the car.

Figure 5:
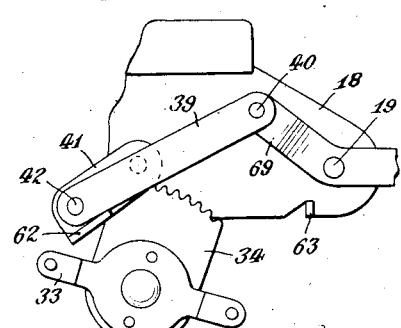
Figure 5 is a fragmentary detail of a portion of some of the motion transmitting elements in the relative positions occupied by them when the shield is in an approximately horizontal plane.

As the center of the stud 42 is below a straight line, extending from the center of the stud 61 through the stud 40, the shield is held against accidental movement from its down or operative position and likewise, as shown in Figure 5, the same conditions exist, the shield cannot be moved from its horizontal position inadvertently or by the jarring of the car.

While I have embodied only one form of my invention for moving a glare shield from a vertical to a horizontal position, and vice versa, by the operator of a car and without removing the hands from the steering wheel, obviously there are other forms in which the principle of my invention may be embodied, and I therefore desire it to be understood that I do not desire to be limited to a structure exactly as herein disclosed, but claim all that falls fairly within the spirit and scope of the appended claims.

What I claim as new and desire to secure by Letters Patent, is:—

1. In a glare device for windshields, an anti-glare shield, a pair of cylinders, pistons having rods in the cylinders, a pivoted toothed segment connected to the piston rods so as to be rocked in opposite directions by the respective rods, a lever pivoted intermediate its ends and connected to the shield, a pair of links pivoted together at their inner ends, the outer end of one link being pivoted to the lever, a pinion on the outer end of the other link in mesh with the segment teeth, and means controlled by the operator to effect actuation of either piston, the pivoted connection of said links being disposed at the extreme positions of the shield so as to lie to one side of a line connecting the outer ends of the links whereby to hold the latter and thereby the shield against accidental movement.

2. In a glare device for windshields, an anti-glare shield, a lever connected to the shield and means to operate the lever including a pair of links pivoted together at their inner ends, one of the links being pivoted to the lever, and means connected to the other link to operate same and thereby the lever, said pivotal connection between the links being movable on opposite sides of a line connecting the outer ends of the links so as to hold the links against accidental operation.

3. In a glare device for windshields, an anti-glare shield, means to movably mount the shield, and mechanical means for operating the shield and for locking the shield against accidental movement in both of its extreme positions, including a pair of links having their inner ends pivoted together, the pivotal connection between the links being movable on opposite sides of a line drawn through the outer ends of the links.

4. In a glare device for windshields, a movable anti-glare shield, means connected to the shield to actuate same, a pair of separate means connected to the actuating means to operate the latter to move the shield in different directions, and manual controlling means for selectively effecting operation of either of said pair of means.

5. In a glare device for windshields, an anti-glare shield, independent actuating means, means connected to the shield and to each of the actuating means for positively operating the shield in different directions and manual controlling means for selectively operating either of the actuating means thereby to move the shield in either of said different directions.

6. In a glare device for windshields, an anti-glare shield, independent fluid actuating means, means connected to the shield and to each of the actuating means for operating the shield, and valve controlled means for effecting independent movement of either of the fluid actuating means to positively move the operating means in selected directions.

7. In a glare device for windshields, an anti-glare shield, operating means connected to the shield, means to effect movement of the operating means and thereby the shield in one direction, independent means to effect movement of the operating means and thereby the shield in a second direction, and manually controlled means to selectively effect actuation of either of the independent means.

8. In a glare device for windshields, an anti-glare shield, operating means connected to the shield, means to effect movement of the operating means connected to the shield, means to effect movement of the operating means and thereby the shield in one direction, independent means to effect movement of the operating means and thereby the shield in a second direction, and means common to each of the independent means and including a valve for selectively controlling actuation of either of the independent means.

9. In a glare device, an anti-glare shield, a pivoted toothed segment, means to rock the segment, a pair of links pivoted together at their inner ends, means to connect one of the links to the shield to effect operation of the latter, and a pinion journaled at a fixed point and being in mesh with the segment teeth and fixed to the opposite end of the other link so as to effect operation of the latter and thereby the shield upon rocking of the segment.

10. In a glare device for windshields, a movable anti-glare shield, a power device located closely adjacent to the shield, distant controlled means for effecting operation of the power device, and combined means between the power device and the shield for moving the latter into and out of operative positions and for locking same independent of the power device in either of its said positions.

11. In a glare device for windshields, a movable anti-glare shield, a power device located closely adjacent to the shield, distant controlled means for effecting operation of the power device, and combined means between the power device and the shield for moving the latter into and out of operative positions and for locking same independent of the power device in either of its said positions including a pair of movable members pivoted together, the pivotal connection between the members being movable on opposite sides of a line drawn through the outer ends of the members.

In testimony whereof, I have hereunto affixed my signature.

ROSS M. G. PHILLIPS.